United States Patent [19]
Kerr

[11] 3,815,021
[45] June 4, 1974

[54] TWO THRESHOLD LEVEL DETECTOR USING A CAPACITIVE OR INDUCTIVE PROBE FOR SORTING

[75] Inventor: Bruce Goring Kerr, Windsor, England

[73] Assignee: Goring Kerr Limited, Berkshire, England

[22] Filed: Jan. 4, 1973

[21] Appl. No.: 321,036

[30] Foreign Application Priority Data
Jan. 6, 1972  Great Britain .................... 612/72

[52] U.S. Cl. .................... 324/61 R, 324/59
[51] Int. Cl. .................... G01r 27/26
[58] Field of Search ........ 324/61 R, 61 P, 57 R, 59; 209/81 A, 81 R

[56] References Cited
UNITED STATES PATENTS

| | | | |
|---|---|---|---|
| 2,948,850 | 8/1960 | Ederer | 324/61 R |
| 2,950,436 | 8/1960 | Butticaz et al. | 324/61 R |
| 3,009,101 | 11/1961 | Locher | 324/61 R |
| 3,039,051 | 6/1962 | Locher | 324/61 R |
| 3,122,956 | 3/1964 | Jucker | 324/61 R X |
| 3,448,381 | 6/1969 | Perry | 324/61 P |
| 3,631,430 | 12/1971 | West | 324/61 R X |

*Primary Examiner*—Stanley T. Krawczewicz
*Attorney, Agent, or Firm*—Lawrence E. Laubscher

[57] ABSTRACT

The specification discloses apparatus for sorting a succession of objects which are passed through a probe on a conveyor. The probes comprise one or two capacitors or inductances whose impedances are varied by the objects passing through. The probe is included in an a.c. bridge circuit whose output is detected by a phase sensitive detector. A discriminator is coupled to the detector by an a.c. coupling, to minimize drift. The discriminator discriminates relative to two threshold levels, the first corresponding to the presence of an object in the probe and the second corresponding to a minimum value of its magnetic or dielectric properties. Embodiments are disclosed in which the second threshold level is a peak amplitude (FIGS. 1 to 5), an integral (gross) magnitude (FIGS. 6 to 8) and an aggregate value of the time for which the instantaneous amplitude exceeds a third threshold (FIGS. 9 to 11).

6 Claims, 14 Drawing Figures

TWO THRESHOLD LEVEL DETECTOR USING A CAPACITIVE OR INDUCTIVE PROBE FOR SORTING

BACKGROUND OF THE INVENTION

This invention relates to electrical apparatus for discriminating objects and particularly but not exclusively to apparatus for sorting a succession of similar objects in response to their dielectric or magnetic properties.

Apparatus of this kind can include a probe comprising a reactance element through which the objects to be discriminated are passed, by a conveyor for example, so that the impedance of the reactance element varies as a function of dielectric or magnetic properties of the objects.

A first signal can be produced which is a function of the impedance of the reactance element during the passage of an object and a second signal can then be produced discriminating values of the first signal between two threshold values from values of the first signal beyond at least one of the threshold values.

It has now been found that the operation apparatus of this kind is liable to drift or otherwise vary over a period of time to a degree which is unacceptable in some circumstances.

An object of one aspect of the invention is to alleviate this problem.

SUMMARY OF THE INVENTION

The invention provides apparatus for discriminating objects comprising electrical probe means including at least one reactance element, advance means for passing the objects in succession through said probe means so that the impedance of said reactance element varies as a function of dielectric or magnetic properties of the objects, signal generating means for producing a first signal which is a function of the impedance of said reactance element during the passage of an object through said probe means, and discriminating means responsive to the time varying magnitude of said first signal for producing a second signal discriminating values of said first signal between two threshold values from values of said first signal beyond at least one of said threshold values whereby to discriminate objects having different dielectric or magnetic properties, characterized in that said signal generating means and said discriminating means are a.c. coupled, whereby to respond selectively to transient changes in the impedance of said reactance element produced by the passage of an object through it.

The a.c. coupling can avoid drift due to foreign matter accumulating in the probe, misalignment or maladjustment of the probe or detector circuits, or instability of the electric circuits.

DESCRIPTION OF THE DRAWINGS

Embodiments of the invention will now be described by way of example with reference to the accompanying drawings in which.

DESCRIPTION OF THE PREFERRED EMBODIMENTS

Figure 1:
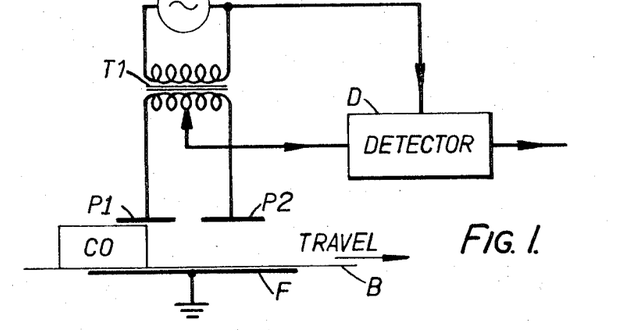
FIG. 1 is a schematic diagram of a probe and detector in one sorting apparatus in accordance with the invention.

FIG. 1 of the drawings illustrates a capacity probe and a detector in a sorting apparatus in accordance with the invention. The sorting apparatus also includes a discriminator responsive to the detector output for actuating a reject mechanism, as shown in FIG. 4.

Referring now to FIG. 1 of the drawings, the probe includes a conveyor belt B for transporting a succession of containers Co which may, for example, contain soap powder. It will be appreciated that the apparatus can be arranged to sort other objects, and the sorting of soap powder containers is described purely as an example. The belt is supported on a frame F which is connected with ground. Two metal capacitor probe plates, P1 and P2, are positioned above the conveyor belt B successively in the direction of travel of the belt, so as to allow the containers on the belt to pass beneath. The frame F provides a common further plate of two capacitors beneath the conveyor with the probe plates P1 and P2 respectively. These two capacitors are connected in two arms of a capacitance bridge, the other two arms being provided by the two halves of the secondary winding of a mutual transformer T1. A centre tap on the secondary winding is connected to a phase sensitive detector D for demodulating the output taken from the bridge. The bridge is driven by an oscillator feeding the primary of the transformer T1.

Figure 4:
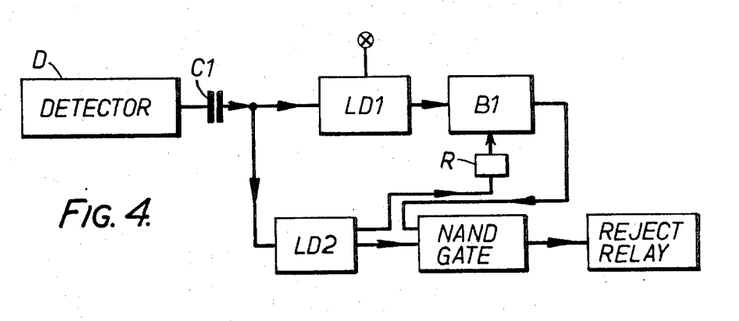
FIG. 4 is a block diagram of the complete electrical circuit.

As shown in FIG. 4, the discriminator includes threshold detectors LD1 and LD2 responsive to the time varying magnitudes of first signals from the detector D relative respectively to two threshold magnitudes and a logic gate for producing a second two-state signal discriminating pairs of the first signals exceeding only one of the thresholds from pairs of the first signals exceeding neither or both of said threshold magnitudes, whereby to discriminate objects having different dielectric properties. The threshold detectors preferably comprise voltage level detectors LD1 and LD2 connected to respond respectively to positive going and negative going voltages from the detector D.

The discriminator includes an a.c. coupling comprising capacitor C in series with the input to the threshold detectors, so as to block d.c. voltages of slow rate of change such as are caused by drift. Negative feedback (not shown in FIG. 4) can also be provided, with a decoupling capacitor, to reduce alternatively or additionally the effects of drift.

In the logic circuit, the detector LD1 is electrically connected to a bistable unit B1 whose output is logic 0 when the positive threshold of LD1 is exceeded and in turn is connected to one input of an NAND gate. The output of the level detector LD2 is logic 0 when actuated by an object and is connected on the one hand to the other input of the NAND gate, and on the other hand by a "reset" coupling R, to a "reset" input of the bistable unit B1. The output terminal of the NAND gate is connected to a "reject" relay.

In operation, when there is no container in the region of the probes, the capacitance bridge is balanced, and there is consequently no output signal. The conveyor belt transports a container into the region of the probes, and as soon as the container comes beneath the first probe P1, the capacitance of the capacitor formed by probe 1 and frame F increases due to the dielectric material in the container, and the bridge becomes unbalanced. This results in the appearance at the output of an alternating voltage signal. The amplitude of this signal increases as the container moves further into the region beneath probe plate P1, until, when it is situated directly beneath the probe, a maximum amplitude signal is obtained. The magnitude of this maximum amplitude depends on the extent of capacitance unbalance produced by the presence of the container. This is in turn dependent upon the quantity of content of the container. As the container proceeds further, the leading end emerges from beneath plate P1 and enters the region beneath probe P2. The bridge then begins to balance out again until the amplitude of the signal becomes zero when the container is shared equally by the two probes, and the capacitances of the two capacitors are equal. Unbalance of the bridge again occurs as the container moves further into the region beneath plate P2. A second alternating voltage signal then appears at the output, this signal being 180° out of phase with the first alternating voltage signal. This signal also increases in amplitude until the container is situated directly beneath the probe plate P2, and then decreases until, when it finally emerges entirely from probe plate P2, the bridge resumes its initial balance, and the output signal disappears.

Figure 3:
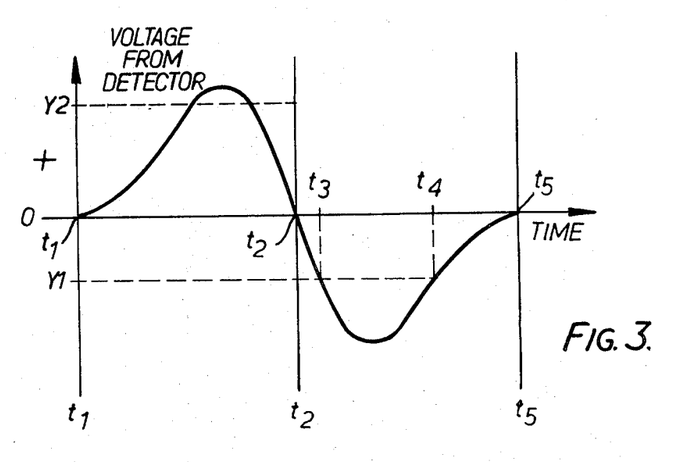
FIG. 3 is a graph of a time-varying voltage obtained from the apparatus of FIG. 1 during the inspection of one test object.

The output signal thus obtained is supplied to the phase sensitive detector D where it is demodulated, and a direct voltage as shown in FIG. 3 is obtained. The voltage of the first part of the movement, from $t_1$ to $t_2$ is positive, corresponding to the effect of the container on probe P1, while that of the second part from $t_2$ to $t_5$ is negative, and is a result of inversion of the phase of the bridge output produced by the effect of the container on probe P2.

Figure 2:
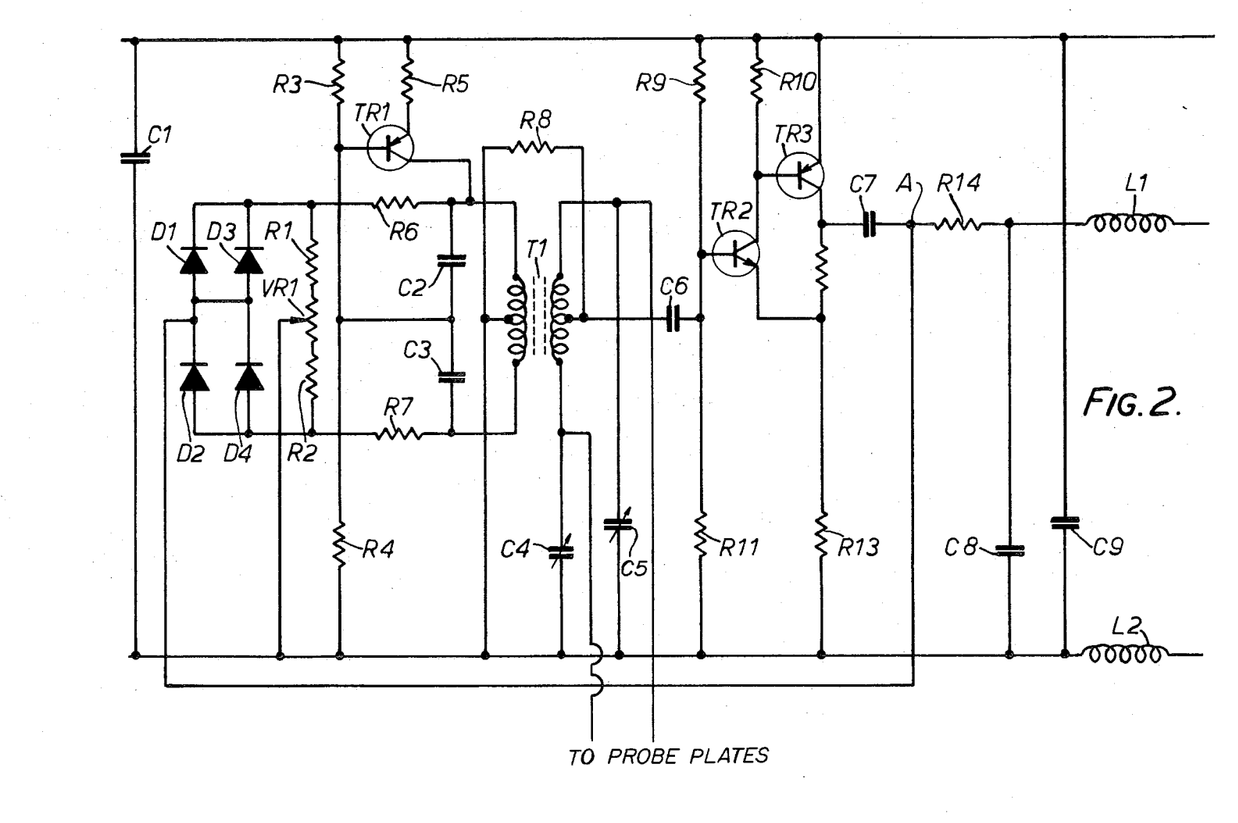
FIG. 2 is a circuit diagram of one form of detector.

The detector output is coupled to the discriminator by the a.c. coupling capacitor C1. The second level detector detects the presence of an object, while the first responds to the gross dielectric constant of the object. The detector output is delivered to the first level detector LD1, which is set to trigger when the positive going probe output voltage reaches a predetermined positive level, Y2 (FIG. 2). Should this level be reached the bistable unit B1 is switched to the logic 0 condition (electrically positive) to block one input to the NAND gate. The following negative part of the probe output between $t_2$ and $t_5$ operates the second level detector LD2 at a preset smaller negative level Y1 from $t_3$ to $t_4$ to change its output from logic 0 to logic 1. The signal from LD2 is passed to the reset unit R and to the other input to the NAND gate. No further action occurs if the first input of the NAND gate is blocked by B1 and the container is accepted. If the level Y2 is not reached while the signal is positive, then B1 remains in the logic 1 condition and the NAND gate therefore operates at $t_3$ when the output of LD1 also becomes 1, and passes a logic 0 signal to operate the reject relay. Such rejection would be the final result of a container being deficient in content of, in this case, soap powder.

There are many other applications of this type of test apparatus. It may be used, for instance, to detect the absence of an object from a pack containing a number of such objects. Another application is the detection of the absence of a piece of one packaged object which may have been broken during manufacture.

Due to the use of a.c. coupling, the bridge circuit is symmetrical, and thus any drift in the detector is fully balanced out. Also, due to symmetry of the bridge, the setting of the probe plates is not critical because a similar variation in height of both P1 and P2 above F during installation does not affect the balance. Because of the symmetrical form of the probe, the apparatus is relatively insensitive to misalignment, and is still more insensitive because of the a.c. coupling by means of capacitor C1. Accordingly, the apparatus can have a high degree of precision so that both a completely empty and an almost, but not quite full packet can be detected and subsequently rejected.

FIG. 2 of the drawings shows the probe and detector circuits in more detail. The oscillator OSC comprises a transistor TR1, the primary of transformer T1, and capacitors C2 and C3 in Colpitts configuration. Trimming capacitors C4 and C5 are connected in shunt with the probe plates P1 and P2. The centre tap of the secondary winding is connected through a blocking capacitor C6, an amplifier comprising transistors TR2 and TR3 and a further blocking capacitor C7 to a point A. The point A is connected to the phase-sensitive detector D, comrising diodes D1 to D4 connected doubled-up in series across a phase reference output of the oscillator OSC. The alternating voltage at A is blocked by chokes L1 and L2 in co-operation with a by-pass capacitor C8.

Figure 5A:
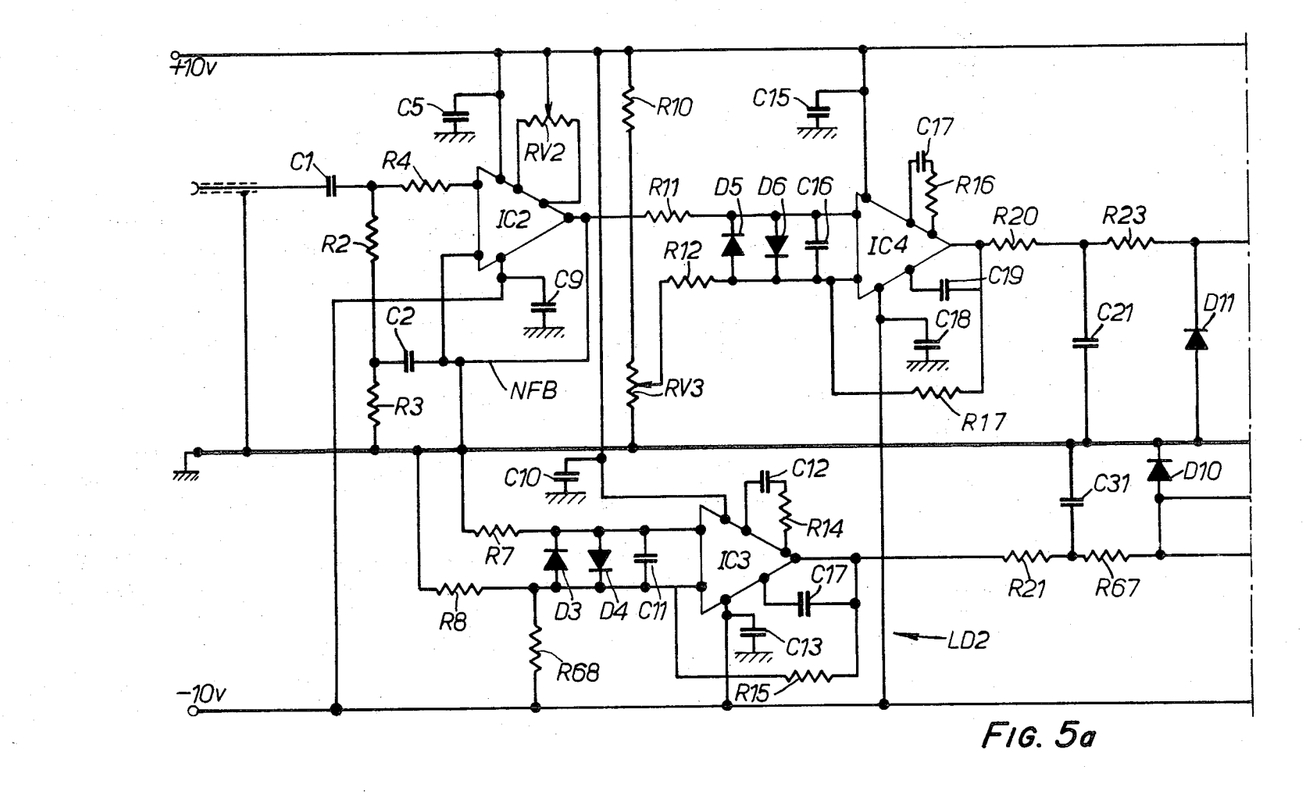
FIGS. 5a-5c show a circuit diagram of a discriminator and reject actuator in the apparatus of FIG. 4.
Figure 5B:
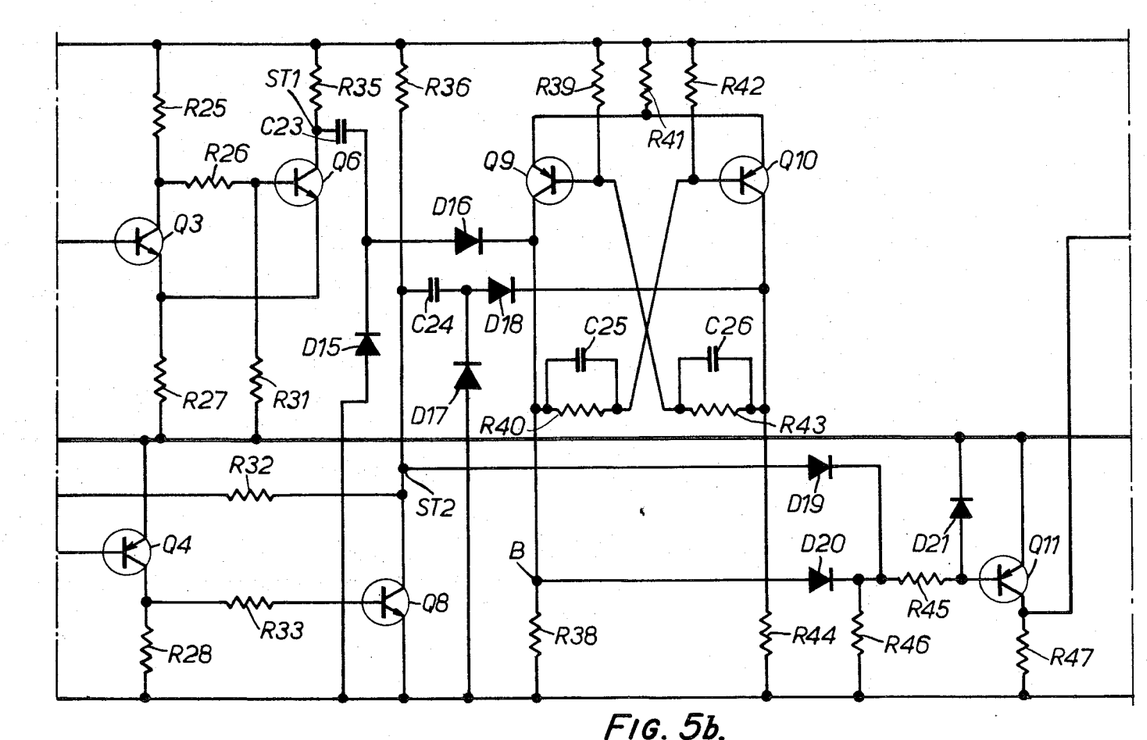
Figure 5C:
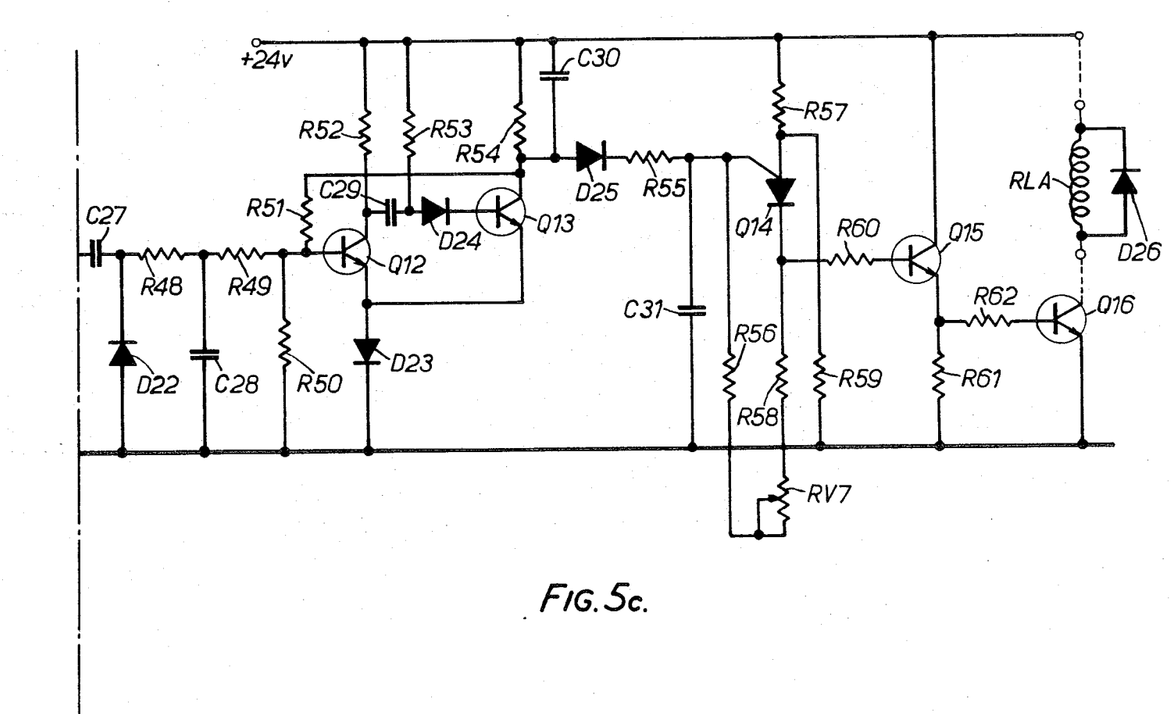

The discriminator circuit is shown in more detail in FIG. 5a. The discriminator input is passed to the capacitor C1, whose time-constant for discharge through resistors R2 and R3 to ground is chosen to block slowly varying direct voltages such as produced by drift while passing the more rapidly varying demodulated voltage output of the detector D to an input of an amplifier IC2. Negative feedback is provided by a connection NFB from an output to another input of the amplifier IC2, a capacitor C2 to the resistor R2 bypassing the negative feedback for the more rapidly varying output of the detector D. Alternatively, or additionally, the effects of drift could be reduced by feedback or feedforward applied to the threshold reference voltages of level detectors LD1 and LD2.

The level detector LD2 comprises an amplifier IC3 having opposed inputs supplied through a limiter, comprising diodes D3 and D4, from the output of amplifier IC2 and from a potential divider comprising resistors R8 and R68 which supplies the negative threshold reference voltage. The output of the amplifier IC3 is supplied to a Schmitt trigger comprising transistors Q4 and Q8 which produces a more negative (logic 1) signal at its output ST2 if and only if the output of the amplifier IC2 is more negative than the threshold reference voltage, as for an object under the probe plate P2.

The level detector LD1 comprises an amplifier IC4 having opposed inputs supplied through a limiter, comprising diodes D5 and D6, from the output of the amplifier IC2 and from a potential divider comprising a resistor R10 and a potentiometer RV3 which supplies the positive threshold reference voltage. The output of the amplifier IC4 is supplied to a Schmitt trigger comprising transistors Q3 and Q6, which produces a more positive pulse at its output ST1 if the output of the amplifier IC2 exceeds the positive threshold reference, as for a full object under probe P1.

The bistable unit B1 comprises transistors Q9 and Q10. The output ST1 is coupled to the base circuit of transistor Q10 by a differentiating capacitor C23 and isolating diodes D15 and D16. A positive going signal on the output sT1 turns transistor Q10 off, which causes transistor Q9 to turn on, applying a positive (logic 0) voltage to the output B of the bistable unit, at the collector of transistor Q9, a negative going pulse at the output ST1 being blocked by the diode D16.

The reset unit R comprises a differentiating capacitor C24 connected to the output ST2 and isolating diodes D17 and D18 connected to the base circuit of transistor Q9; a positive going signal at the output ST2 as at $t_4$ is passed by the diode D18 and turns the transistor Q9 off, which causes the transistor Q10 to turn on and applies a negative voltage to the output B.

The gate circuit comprises diodes D19 and D20, whose anodes are connected respectively to outputs ST2 and B, and whose cathodes are connected in common to the base circuit of a transistor Q11. The collector of the transistor Q11 is connected via a smoothing differentiating capacitor C27 and smoothing capacitor 28 to a monostable trigger comprising transistors Q12 and Q13 which supplies firing pulses to a thyristor Q14 if the outputs ST2 and B are simultaneously negative (logic 1). The thyristor controls the reject relay RLA through a power amplifier comprising transistors Q15 and Q16 and has a self extinguishing feedback circuit including resistor R56, R58 and RV7 and delay capacitor C31.

Figure 6:
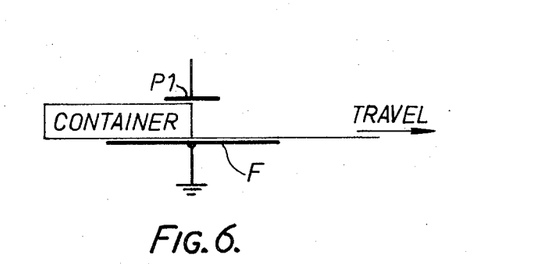
FIG. 6 is a schematic diagram of a probe in another sorting apparatus in accordance with the invention for sorting elongate objects.
Figure 7:
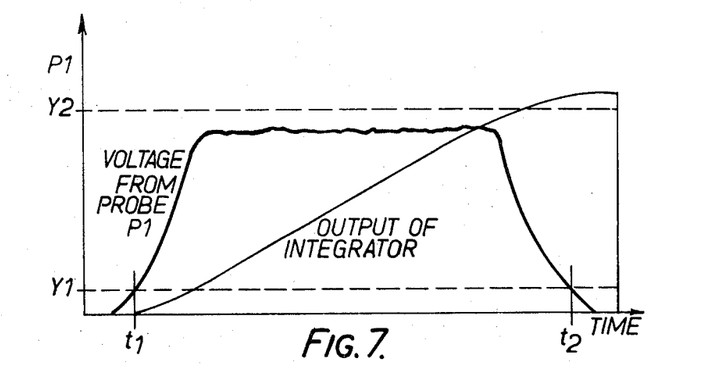
FIG. 7 is a graph of a time-varying voltage signal obtained from the apparatus of FIG. 6 during the inspection of a test object.
Figure 8:
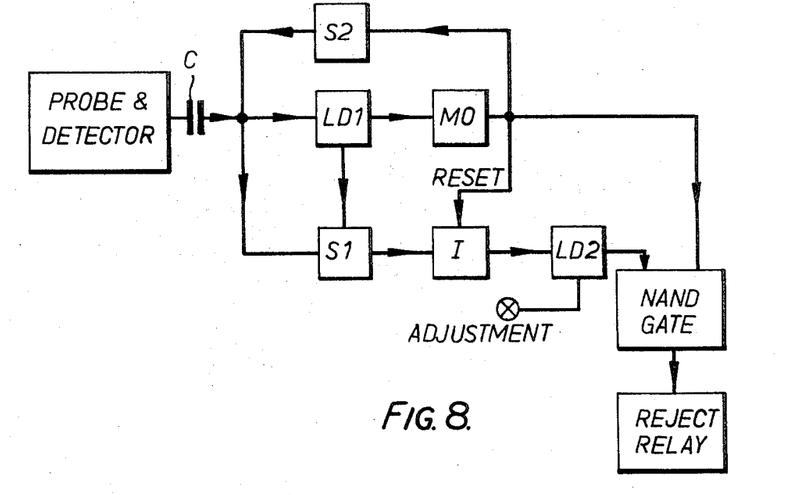
FIG. 8 is a block diagram of the complete electrical circuit of the apparatus of FIG. 6.

The apparatus shown in FIGS. 6 to 8 is particularly suitable for discriminating a succession of similar long objects for example 1 or 2 feet long and less than a foot wide. The apparatus comprises a single capacitor comprising first and second capacitor plates and means for passing the objects in succession between the plates, signal generating means for producing a first signal which is a function of the impedance of said capacitor, and hence of the dielectric properties of an object passing between said plates, a.c. coupling means for passing the output of the generating means, signal integrating means responsive to said first signal to produce a second signal by integrating said first signal, and discriminating means responsive to the time-varying magnitudes of said first and second signals relative respectively to first and second threshold magnitudes for producing a third signal discriminating sets of said first and second signals wherein only said first threshold magnitude is exceeded from sets of said first and second signals wherein both or neither of said threshold magnitudes are exceeded, whereby to discriminate objects having different gross dielectric properties.

With reference to FIG. 6, the probe plate P1 is smaller in its dimension parallel to the direction of travel of the belt, than the length of the object to be inspected. The width of the probe may be equal to the width of the object or, if the object is consistent across its width, only a fraction of the width of the object.

The apparatus shown diagrammatically in FIG. 8 is designed to integrate the probe output voltage and reject those objects which give less than a predetermined value of the integral.

A coupling capacitor C couples the probe apparatus to the level detector LD1 which is responsive to an input signal reaching a predetermined low positive level Y1 (FIG. 7) to cause an electronic switch S1 to connect the output from the probe to the integrator I. The output of I is coupled to a second level detector LD2, whose output is connected to one input of a NAND gate, the other input thereof being connected to the output of a monostable unit Mo whose input is supplied by LD2 and which has other outputs connected to reset the integrator I, and to a switch S2 which is a switch for discharging the capacitor C1.

In operation, the passage of an object between the probe P1 and the frame F puts out of balance a bridge comprising the probe P1 and a reference capacitor (not shown), resulting in the production of an alternating voltage signal. FIG. 7 shows this signal after demodulation. The demodulated probe output is delivered to a first level detector LD1 which is set to trigger when the probe output voltage reaches the low positive level Y1 causing the electronic switch S1 to connect the output of the probe apparatus to the integrating unit I whose output passes to the second level detector LD2. LD2 triggers when the integral of the signal reaches a predetermined and adjustable level Y2. Accordingly the first level detector detects the presence of an object, while the second responds to the gross dielectric constant of the object. At time $t_2$ (FIG. 7) LD1 is restored to its normal condition, thereby switching off S1, and interrupting the input to the integrating unit. LD1 also operates a monostable unit Mo to provide a pulse to reset the integrator, discharge the capacitor C, and to produce a logic 0 signal to sample the NAND gate. If, by this time LD2 is triggered, there is a logic 1 signal present at one input of the NAND gate; in these circumstances no reject signal is given. If, however, LD2 has not triggered, the NAND gate produces a reject signal in response to the sampling pulse.

The magnitude of the output from I depends upon the amplitude of the probe signal and upon its duration. The duration of the signal from $t_1$ to $t_2$ is dependent on the speed of the conveyor system transporting the object being tested, and since the integral is approximately proportional to this time $t_1$ to $t_2$, in order to compensate for variations in this time due to variations in the conveyor speed, the oscillator voltage driving the probe bridge can be arranged to be proportional to the conveyor speed, so that the integral is then relatively independent of the speed of the conveyor. This can be achieved by using a "Tacho" generator driven by the conveyor to supply a bias voltage which drives the oscillator. Then, if the conveyor speed increases, shortening the integrating time, the output from the oscillator increases and the integral remains the same. Alternatively, the threshold reference voltage of the level detector LD2 can be made proportional to the integration period for example by using the output of a synchronous integrator (not shown) supplied with a constant input.

Figure 9:
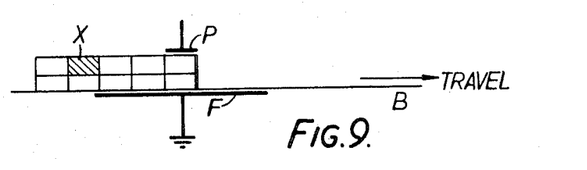
FIG. 9 is a schematic diagram of a probe in a different sorting apparatus in accordance with the invention for sorting packages containing a number of similar individual items.
Figures 11, 12:
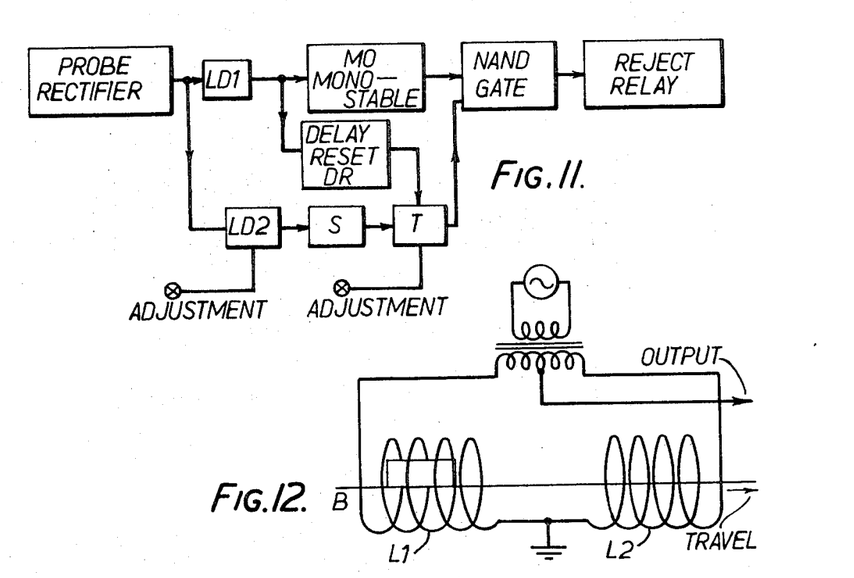
FIG. 11 is a block diagram of the complete electrical circuit of the apparatus of FIG. 9.
FIG. 12 is a schematic diagram of part of the electrical circuit of yet another sorting apparatus in accordance with the invention.

The apparatus of FIGS. 9 and 11 is suitable for discriminating a succession of packages, each of which contains a number of similar individual items, and for rejecting those packages which do not contain a specified number of the items.

This apparatus includes a single capacitor comprising first and second capacitor plates and means for passing the objects in succession between the plates, signal generating means for producing a first signal which is a function of the impedance of said capacitor, and hence of the dielectric properties of an object passing between said plates, a.c. coupling means for passing said first signal, timing means responsive to the period of time during which said first signal exceeds a predetermined level for producing a second signal and discriminating means responsive to the time varying magnitudes of said first and second signals relative respectively to first and second threshold magnitudes for producing a third signal discriminating sets of said first and second signals wherein only said first threshold magnitude is exceeded, from sets of said first and second signals wherein both or neither of said threshold magnitudes are exceeded, whereby to discriminate objects having different dielectric properties.

FIG. 9 shows a probe plate P positioned above a conveyor belt B so as to allow packages, containing a number of similar items, and travelling on the conveyor belt in the direction shown, to pass beneath it. As in the previous embodiments, the conveyor belt is supported on a frame F which is grounded. The probe plate is arranged to be approximately the same size as the individual items in the package. The capacitor constituted by the frame and the probe plate is connected as for FIG. 8 in a balanced capacity bridge, the output of which is connected to a phase discriminator.

With reference now to FIG. 11, two voltage level detectors LD1 and LD2 are connected to receive the output from the probe apparatus. The output of the first level detector LD1 is electrically connected firstly to a monostable unit Mo whose output is 1 when the output of LD1 is negative going and is connected to a first input terminal of a NAND gate, and secondly to a delayed reset unit DR producing a reset signal after a delay when the output of LD1 reverts to its normal state as the package moves the probe.

The output of the second level detector LD2 controls a switch S to apply a reference voltage to a timer T, which applies a logic 0 signal to another input of the NAND gate if the integrated reference voltage exceeds a threshold Y3, i.e., if switch S is operated for longer than a threshold period. The timer T is reset to 1 by the reset signal.

In operation, the capacitance bridge is put out of balance when a package moves into the region between probe plate P and the frame F. The resulting output from the bridge, after demodulation, is shown graphically in FIG. 10. This figure shows the output obtained as a result of the testing of a package deficient in one item, shown as X in FIG. 9. As the package proceeds beneath the probe plate, the voltage output reaches a level Y2, and would normally, if the package were full, remain at this level until the package left the region of the probe. If, however, as in this case, an item is missing from the package, the bridge will partially balance out as the empty space comes beneath the probe plate P and a small dip in the bridge output voltage to V3 will occur, as shown at Q of FIG. 10.

The level detector LD1 will respond to a very low voltage level (Y1 in FIG 10) such as would be produced by the passing of an empty package, to produce a positive signal. The monostable unit Mo responds by producing a logic signal 1 only subsequently at $t_3$ when the signal from LD1 falls to zero again, so that the NAND gate is sampled at $t_3$. The output of the timer T will be logic 1 also since its input is unenergised. Thus, both inputs to the gate are zero, and the gate therefore gives a logic 0 output pulse which rejects the empty package. The fall of the voltage to zero causes the reset unit R to produce a reset pulse which is ineffective.

By the above operation, an empty package is rejected. When a full package passes beneath the probe, a voltage level Y2 is reached which operates LD2 to operate switch S to start the timer T. The latter produces a control voltage shown in FIG. 10 which rises when the Switch S is operated, and which remains constant (or falls) when the switch S is released, if the input to LD2 falls below Y2. The timer responds to this control voltage reaching a predetermined level Y3, to give a logic 0 at its output, passed to the gate. Thus when the gate is sampled by the monostable Mo, one input is logic 0 and the gate continues to produce a logic 1 output which prevents operation of the reject mechanism.

Figure 10:
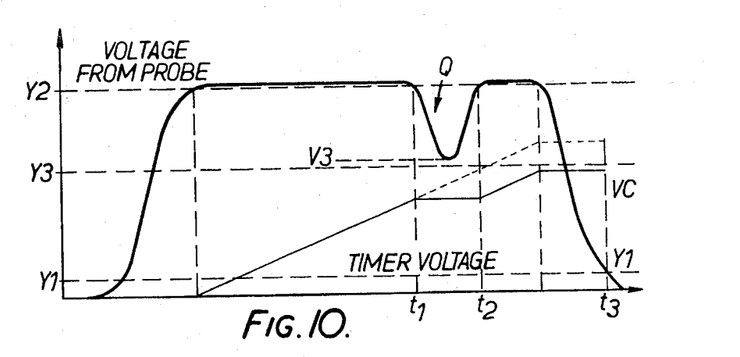
FIG. 10 is a graph of a time-varying voltage signal obtained from the apparatus of FIG. 9 during the inspection of one test package.

If however, the probe voltage output shows some fluctuation, as at Q in FIG. 10 resulting from one or more items missing from the package, the switch S will be released for part of the period, and the control voltage will not reach the predetermined level Y3 by the time $t_3$. The voltage at both inputs of the gate will therefore be logic 1, and the gate will give a reject pulse.

The sensitivity of the apparatus to deficient packages will depend on the mode of operation of the timer. For instance the time $t1$ to $t2$ (FIG. 10) during which the probe output falls below Y2 can be arranged to linearly alter the voltage output from the timer or can be arranged to have a very much magnified effect. This can be accomplished by arranging the voltage V3 to start a discharge of the timing capacitor. Hence the effect of a very short pulse from $t1$ to $t2$ may be made larger.

In some cases a very high degree of sensitivity is not required. An example of such a case may be where there are small gaps between the individual items in the package. However, if it were necessary to detect a crack in a very long solid object, then detection of small pulses would be essential.

Since, in this embodiment, there is only a small fraction of the package under the probe at a given time, the discrimination against irregularities in the packaging is greater than if the whole package was under the probe i.e., if the plate P was made the full size of the large package. If the probe plate is made even smaller, it is possible to detect fractions of the individual package which are missing.

Certain adjustments may be made to parts of the apparatus to permit the device to be used for sorting packages of different sizes. To adjust for various heights of packages, the voltage level Y2 at which LD2 operates may be varied. The time required for the timer T to produce a voltage at the input to the AND gate in response to a voltage greater than or equal to Y2 being maintained at the input to LD2, is also adjustable. This adjustment allows for objects of different length to be sorted. For example, if the objects were short, the timer would have to be set to a short time.

In each of the three foregoing embodiments of the invention, the capacity probe may be replaced by an inductive probe.

Thus, FIG. 12 shows a probe corresponding to that shown in FIG. 1 but using inductive elements. Two similar inductive coils L1 and L2 are positioned successively in the direction of travel of the conveyor belt B, having a common axis parallel to the belt, which passes through the said coils. These coils are connected in two arms of an inductance bridge, the output of which is connected to a discriminating circuit as before.

This arrangement is suitable for discriminating a succession of metal objects. Thus, ball bearings may be checked for size, or various metal objects may be checked for total mass, or for whether they are ferrous or non-ferrous.

The bridge shown in FIG. 12 would produce a similar output pulse as a result of the passage of a metal object through the coils, as would the bridge of FIG. 1 resulting from the passing beneath the probe plates of a dielectric body.

The adaptation of the apparatus of FIG. 6 to an inductive system would be similar to that described above, except that the belt would pass through one coil only, and the bridge would be balanced with a dummy coil.

I claim:

1. Apparatus for discriminating objects, comprising:

a. electrical probe means including at least one reactance element;
   b. advancing means for passing the objects in succession through said probe means;
   c. signal generating means responsive to the time variations in the impedance of said reactance element as said objects pass through said probe means for producing a first signal which is a function of said impedance;
   d. a discriminating circuit; and
   e. alternating current coupling means connected between said signal generating means and said discriminating circuit for transmitting transient changes in said first signal, said discriminating circuit including first and second threshold level detectors having different threshold levels, and gating means responsive to an output from no more than one threshold level detector to produce a discriminating signal when the magnitude of said first signal has a value exceeding the threshold value of no more than one of said level detectors.

2. Apparatus as claimed in claim 1, in which a signal integrator is connected in the input of said first signal to said second threshold level detector, and further including switching means for starting said signal integrator when said first signal exceeds the threshold value of said first threshold level detector.

3. Apparatus as claimed in claim 1, in which a ramp signal timing means is connected in the output of said second threshold level detector for generating a rising signal when energized by said second threshold level detector.

4. Apparatus for discriminating objects, comprising a. a frame (F);
   b. electrical probe means including identical first and second coplanar reactance elements (P1, P2) arranged in spaced relation to said frame, respectively;
   c. means (B) for advancing a plurality of objects in succession between said first and second reactance elements and said frame, respectively;
   d. signal generating means including
      i. a normally balanced bridge circuit having opposed arms in which the first and second reactance elements are respectively connected, whereby said bridge circuit arms are unbalanced first in one sense and then in the opposite sense as each object passes in succession between said first and second reactance elements and said frame, respectively;
      ii. power supply means for supplying alternating-current power to said bridge circuit, and
      iii. detector means connected with the output of said bridge circuit for producing a first signal varying in polarity and magnitude as the sense and degree of unbalance of said bridge as each object passes in turn between said reactance elements and said frame;
   e. a discriminator circuit; and
   f. coupling means connected between said detector means and said discriminator circuit for transmitting transient changes in said first signal, said discriminator circuit including first and second threshold level detectors having threshold levels of opposite sense and different values, and gating means responsive to an output from no more than one of said threshold level detectors for producing a discriminating signal when the magnitude of said first signal has a value exceeding the threshold value of no more than one of said level detectors.

5. Apparatus as claimed in claim 4, wherein said detector means comprises a phase-sensitive detector having a phase reference input connected with said power supply means.

6. Apparatus as claimed in claim 4, and further including a bistable circuit connected between said first threshold level detector and said gating means, and resetting means for said bistable circuit, said resetting means being connected with an output of said second threshold level circuit.

* * * * *